(12) United States Patent
Cheng

(10) Patent No.: US 8,997,018 B2
(45) Date of Patent: Mar. 31, 2015

(54) PRESENTING A MENU

(75) Inventor: Yi-Hsun E. Cheng, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 1824 days.

(21) Appl. No.: 12/074,583

(22) Filed: Mar. 4, 2008

(65) Prior Publication Data

US 2009/0228832 A1    Sep. 10, 2009

(51) Int. Cl.
*G06F 3/048* (2013.01)
*G06F 3/023* (2006.01)
*G06F 3/0482* (2013.01)

(52) U.S. Cl.
CPC ............ *G06F 3/0236* (2013.01); *G06F 3/0482* (2013.01)
USPC .......................................................... 715/810

(58) Field of Classification Search
CPC .......................... G06F 3/0482; G06F 17/30572
USPC .......................................................... 715/810
See application file for complete search history.

(56) References Cited

U.S. PATENT DOCUMENTS

| | | | | |
|---|---|---|---|---|
| 5,613,122 | A * | 3/1997 | Burnard et al. | 713/1 |
| 5,630,131 | A * | 5/1997 | Palevich et al. | 717/108 |
| 6,240,410 | B1 * | 5/2001 | Wical | 1/1 |
| 6,252,597 | B1 * | 6/2001 | Lokuge | 715/841 |
| 6,606,105 | B1 * | 8/2003 | Quartetti | 715/853 |
| 6,854,093 | B1 * | 2/2005 | Dahl et al. | 716/124 |
| 7,992,106 | B2 * | 8/2011 | Nelson | 715/854 |
| 2002/0055868 | A1 * | 5/2002 | Dusevic et al. | 705/9 |
| 2005/0027524 | A1 | 2/2005 | Wu et al. | |
| 2005/0054381 | A1 * | 3/2005 | Lee et al. | 455/557 |
| 2005/0076309 | A1 | 4/2005 | Goldsmith | |
| 2006/0236349 | A1 * | 10/2006 | Lee | 725/80 |
| 2007/0028168 | A1 | 2/2007 | Robbins et al. | |
| 2008/0059912 | A1 * | 3/2008 | Scherpa et al. | 715/853 |
| 2008/0307367 | A1 * | 12/2008 | Garrison et al. | 715/853 |

FOREIGN PATENT DOCUMENTS

WO    WO-2006/060263    6/2006

OTHER PUBLICATIONS

ISA/KR, International Search Report and Written Opinion for International Application No. PCT/US2009/030183, 8 pages, Jul. 27, 2009.

* cited by examiner

*Primary Examiner* — Sara England

(57) ABSTRACT

A method for presenting a menu. A first menu level of a hierarchical menu structure is displayed in a one-dimensional list. A second menu level of the hierarchical menu structure is displayed in the one-dimensional list, wherein the second menu level is dependent on a selectable item of the first menu level and wherein items of the first menu level are contiguous and items of the second menu level are contiguous.

23 Claims, 8 Drawing Sheets

200

```
Display a multiple selection menu comprising a plurality of
selectable hierarchical menu structures for selection.
205
                        │
                        ▼
Display a first menu level of a hierarchical menu structure in
a one-dimensional list.
210
    ┌─────────────────────────────────────────────────┐
    │ Display a portion of selectable items of the first menu │
    │ level according to a probability of selection.   │
    │ 212                                              │
    └─────────────────────────────────────────────────┘
                        │
                        ▼
Display a second menu level of the hierarchical menu
structure in the one-dimensional list, wherein the second
menu level is dependent on a selectable item of the first
menu level and wherein items of the first menu level are
contiguous and items of the second menu level are
contiguous.
215
    ┌─────────────────────────────────────────────────┐
    │ Display items of the second menu level in an opposite │
    │ order as the items of the first menu level.      │
    │ 220                                              │
    └─────────────────────────────────────────────────┘
    ┌─────────────────────────────────────────────────┐
    │ Make items of the second menu level visually distinct │
    │ from items of the first menu level.              │
    │ 225                                              │
    └─────────────────────────────────────────────────┘
    ┌─────────────────────────────────────────────────┐
    │ Display a portion of selectable items of the second │
    │ menu level according to a probability of selection. │
    │ 228                                              │
    └─────────────────────────────────────────────────┘
                        │
                        ▼
Display a selected browsing path for indicating selected
items of the hierarchical menu structure.
230
                        │
                        ▼
                       (A)
```

```
┌─────────────────────────────────────────────────────────┐
│ Display a multiple selection menu comprising a plurality │
│ of selectable hierarchical menu structures for selection │
│ including a hierarchical phonetic-to-ideogram conversion │
│ menu structure.                                          │
│ 505                                                      │
└─────────────────────────────────────────────────────────┘
                            ↓
┌─────────────────────────────────────────────────────────┐
│ Receive a first input for text entry.                    │
│ 510                                                      │
└─────────────────────────────────────────────────────────┘
                            ↓
┌─────────────────────────────────────────────────────────┐
│ Display a phonetic selection menu level of the phonetic- │
│ to-ideogram conversion menu structure in a one-          │
│ dimensional list.                                        │
│ 515                                                      │
└─────────────────────────────────────────────────────────┘
                            ↓
┌─────────────────────────────────────────────────────────┐
│ Display a ideogram selection menu level of the phonetic- │
│ to ideogram conversion menu structure in the one-        │
│ dimensional list, wherein the ideogram selection menu    │
│ level is dependent on a phonetic entry of the phonetic   │
│ selection menu level and wherein phonetic entries of the │
│ phonetic selection menu level are contiguous and         │
│ ideograms of the ideogram selection menu level are       │
│ contiguous.                                              │
│ 520                                                      │
└─────────────────────────────────────────────────────────┘
                            ↓
┌─────────────────────────────────────────────────────────┐
│ Display a multiple ideogram selection menu level of the  │
│ phonetic-to ideogram conversion menu structure in        │
│ response to a selection of an ideogram of the ideogram   │
│ selection menu level, wherein the multiple ideogram      │
│ selection menu level is dependent on the ideogram of the │
│ ideogram selection menu level.                           │
│ 525                                                      │
└─────────────────────────────────────────────────────────┘
                            ↓
┌─────────────────────────────────────────────────────────┐
│ Display a text entry separator selection menu level of   │
│ the phonetic-to-ideogram conversion menu structure.      │
│ 530                                                      │
└─────────────────────────────────────────────────────────┘
                            ↓
┌─────────────────────────────────────────────────────────┐
│ Output an ideogram to an application in response to a    │
│ selection of a text entry separator of the text entry    │
│ separator selection menu level.                          │
│ 535                                                      │
└─────────────────────────────────────────────────────────┘
```

FIG. 5

PRESENTING A MENU

FIELD

The present invention generally relates to the field of presenting data.

BACKGROUND

Recent technological advances have led to the increased prevalence of electronic devices, e.g., small electronic devices such as handheld media devices and cellular telephones. These electronic devices often are able to store large amounts of data, e.g., numbers, text, music, photographs, videos, and documents, for audio and/or visual display. Typical graphical user interfaces for electronic devices include a hierarchical menu structure for navigating through the stored data for selection. As the storage capacity of these devices grows, it becomes increasingly important to provide for effective browsing and selection of the desired data. Furthermore, due to the small size of many electronic media devices, these devices typically have small display devices for displaying information used to navigate.

Often, these types of electronic devices provide one-dimensional presentation of menus on a display. Conventional one-dimensional presentation of menus involves presenting a single menu level of a hierarchical menu structure on the display for selection. Selection of an item in the single menu level results in the display of a subsequent menu level. Further, subsequent selections result in the display of subsequent menu levels to allow "drilling down" to the desired final selection. Devices supporting one-dimensional presentation of menus are useful due to their high compatibility to the menu hierarchy. In a menu hierarchy, data are classified and distributed in a tree structure where they become searchable through a series of attribute matching. As a result, each menu typically contains only a small number of options that can easily be synchronized to a one-dimensional scrolling mechanism/device for selection.

SUMMARY

Various embodiments of the present invention, presenting a menu, are described herein. In one embodiment, a method for presenting a menu is provided, in which a first menu level of a hierarchical menu structure is displayed in a one-dimensional list. A second menu level of the hierarchical menu structure is displayed in the one-dimensional list, wherein the second menu level is dependent on a selectable item of the first menu level and wherein items of the first menu level are contiguous and items of the second menu level are contiguous.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 2A and 2B are a flowchart diagram illustrating a process for presenting a menu, in accordance with an embodiment of the present invention.

FIG. 5 is a flowchart diagram illustrating steps in a process for presenting a phonetic-to-ideogram conversion menu structure, in accordance with one embodiment of the present invention.

DESCRIPTION OF EMBODIMENTS

Reference will now be made in detail to the various embodiments of the invention, examples of which are illustrated in the accompanying drawings. While the invention will be described in conjunction with the various embodiments, it will be understood that they are not intended to limit the invention to these embodiments. On the contrary, the invention is intended to cover alternatives, modifications and equivalents, which may be included within the spirit and scope as defined by the appended claims. Furthermore, in the following description of various embodiments, numerous specific details are set forth in order to provide a thorough understanding of embodiments of the present invention. In other instances, well-known methods, procedures, components, and circuits have not been described in detail so as not to unnecessarily obscure aspects of embodiments of the present invention.

Various embodiments of the present invention, presenting a menu, are described herein. In one embodiment, a method for presenting a menu is provided, in which a first menu level of a hierarchical menu structure is displayed in a one-dimensional list. A second menu level of the hierarchical menu structure is displayed in the one-dimensional list, wherein the second menu level is dependent on a selectable item of the first menu level and wherein items of the first menu level are contiguous and items of the second menu level are contiguous.

Figure 1:
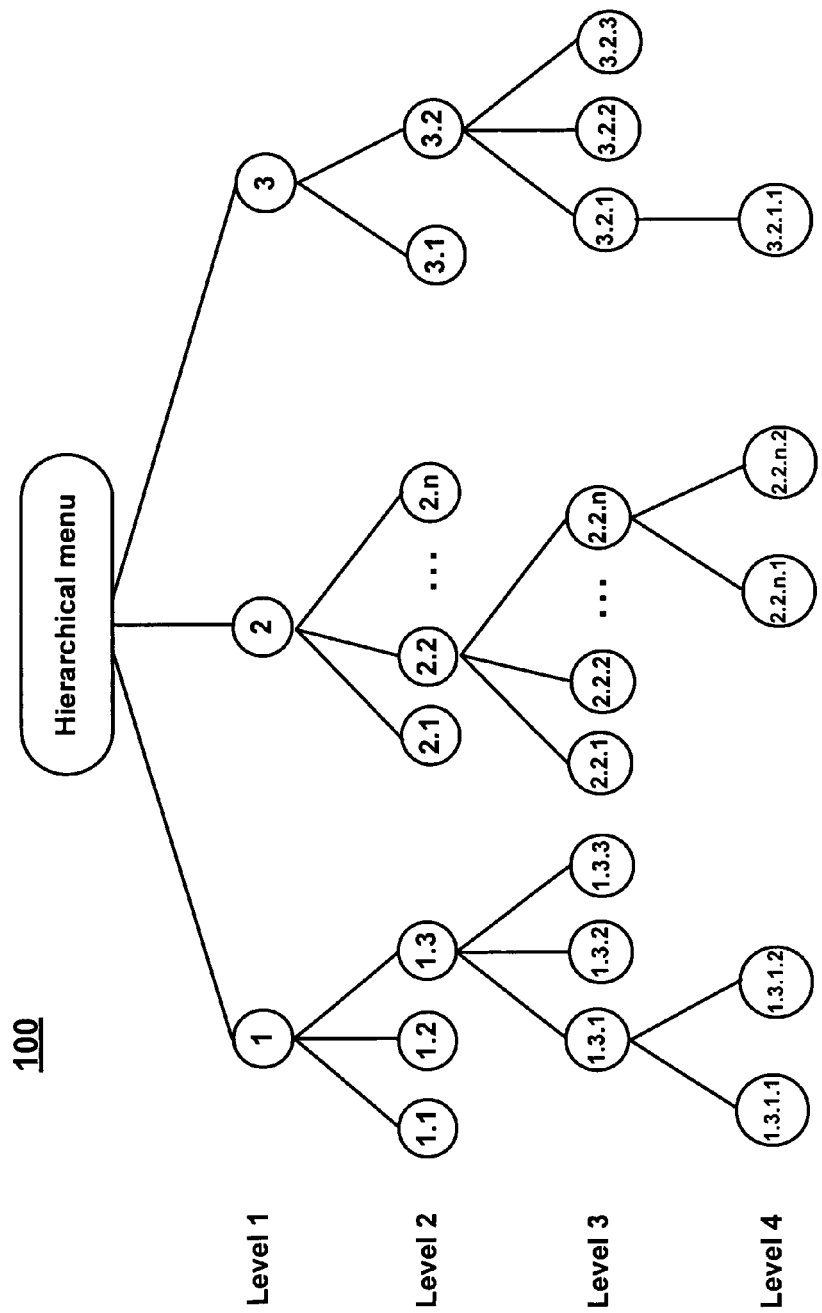
FIG. 1 is a schematic diagram showing an example hierarchical menu structure, in accordance with an embodiment of the present invention.

FIG. 1 is a schematic diagram showing an example hierarchical menu structure 100 in accordance with an embodiment of the present invention. A hierarchical menu structure organizes data into a tree-like structure. For example, successive levels of a hierarchical menu structure are each related to an item of a preceding level. It should be appreciated that items of a hierarchical menu structure can include links to subsequent menu levels or data items.

Example hierarchical menu structure 100 includes four levels having varying number of items per level. It should be appreciated that, in accordance with embodiments of the present invention, a hierarchical menu structure may include any number of levels and any number of items within each level. Moreover, it should be appreciated that a hierarchical menu structure in accordance with embodiments of the present invention can be dynamic.

As shown, each level of example hierarchical menu structure 100 includes varying numbers of items, where items can include a link to a next level or a data item. For example, Level 1 of hierarchical menu structure 100 includes item 1, item 2 and item 3, all of which are links to lower levels of hierarchical menu structure 100. Item 3.1 of Level 2 might be a data item or an empty menu level, while item 3.2 of Level 2 is a link to subsequent menu level.

In one embodiment, the hierarchical menu structure includes a text entry menu structure, as described in accordance with process 500 of FIG. 5. In one embodiment, the text entry menu structure includes a character-to-word conversion menu structure, wherein the first menu level includes a character selection, the second menu level includes a word selection, and the third menu level includes a multiple word selection. In another embodiment, the text entry menu structure includes a phonetic-to-ideogram conversion menu structure, wherein the first menu level includes a phonetic selection, the second menu level includes an ideogram selection, and the third menu level includes a multiple ideogram selection. In one embodiment, a last menu level of the text entry menu structure includes a text entry separator selection.

It should be appreciated that embodiments of the present invention can implement any type of hierarchical menu structure and are not limited to the above-described example. Hierarchical menu structures are well-known in the art, and one of ordinary skill in the art would understand how to implement embodiments of the present invention using different types of hierarchical menu structures.

Figure 2B:
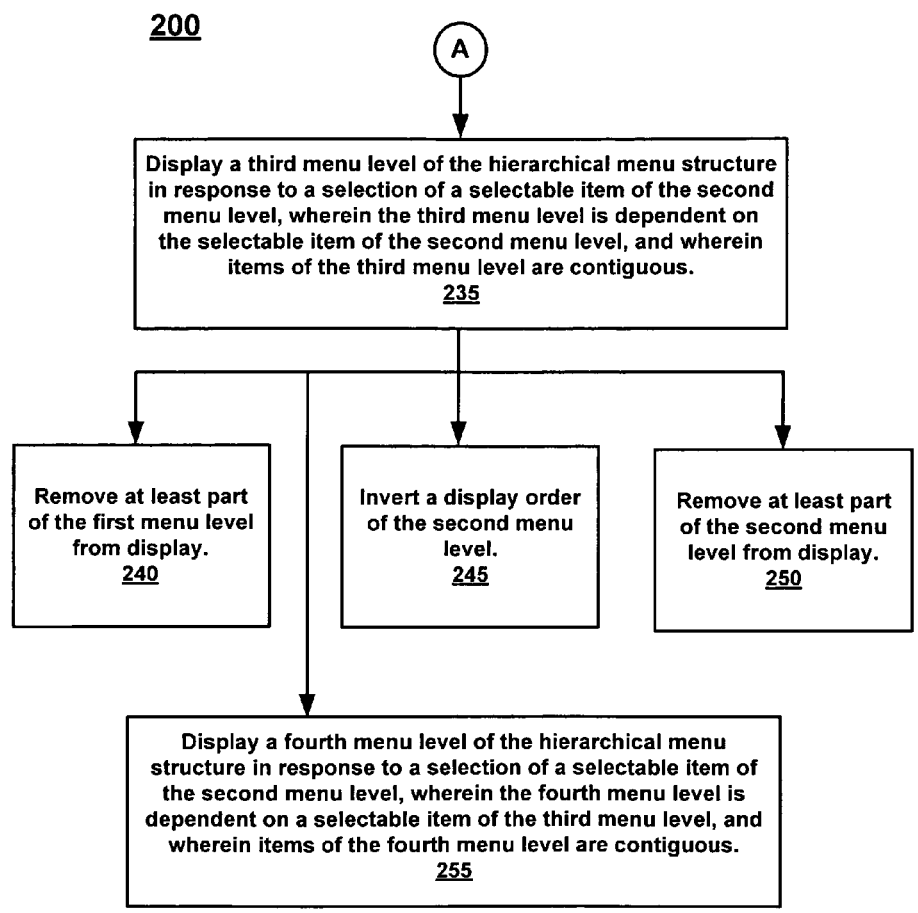

FIGS. 2A and 2B are a flowchart illustrating a process 200 for presenting a menu in accordance with an embodiment of the present invention. Although specific operations are disclosed in process 200, such steps are exemplary. That is, embodiments of the present invention are well-suited to performing various other operations or variations of the operations recited in process 200. The operations in process 200 may be performed in an order different than presented, and it is possible that not all of the operations in process 200 are performed. All of, or a portion of, the operations described by process 200 may be implemented using computer-readable and computer-executable instructions which reside, for example, in computer-usable media of a computer system. In one embodiment, process 200 is performed in an electronic device.

With reference to FIG. 2A, at block 205 of process 200, a multiple selection menu including a plurality of selectable hierarchical menu structures is displayed. In one embodiment, the multiple selection menu is for presenting a list of potential selections to a user, such as different text entry hierarchical menu structures. For example, the multiple selections menu may include selection options such as a phonetic Chinese-to-word conversion menu structure, a phonetic Japanese-to-word conversion menu structure, and a phonetic Korean-to-word conversion menu structure.

At block 210, a first menu level of a hierarchical menu structure is displayed in a one-dimensional list, e.g., menu level 1 of FIG. 1. In one embodiment, as shown at block 212, a portion of selectable items of the first menu level is shown, wherein the portion is chosen according to a probability of selection. For example, a first menu level may include ten selectable items, but only the five selectable items having the highest probabilities of selection are displayed.

At block 215, a second menu level of the hierarchical menu structure is displayed in the one-dimensional list, e.g., a portion of menu level 2 of FIG. 1, wherein the second menu level is dependent on a selectable item of the first menu level. In one embodiment, items of the first menu level are contiguous and items of the second menu level are contiguous. In other words, the items of the first menu level are grouped together and items of the second menu level are grouped together.

Various embodiments of the present invention provide a reduction of menu browsing stages by predicting possible browsing path in a menu hierarchy. It should be appreciated that, in one embodiment, block 215 can be performed automatically without user interaction. For example, a probabilistic determination as to which menu item of the first menu level that is most likely to be selected is made, and at block 215 the second menu level associated with this menu item is displayed. In another embodiment, block 215 is performed in response to a user selecting a menu level item of the first menu level.

Furthermore, it should be appreciated that, in various embodiments, the hierarchical menu structure is dynamic such that orders of items of at least one menu level adapts based at least in part on a pattern of usage. For example, in some embodiments, an order of items the first menu level and an order of the items of the second menu level adapt based at least in part on a pattern of usage. The order of items, for example, may change to reflect how a pattern of usage dynamically alters the probabilities of selection for the items of the hierarchical menu structure. As the probabilities are altered, the ordering of the items within the various menu levels can be altered such that those items with the highest probabilities of being selected are presented for easier selection.

In one embodiment, as shown at block 220, displaying the second menu level includes displaying the items of the second menu level in an opposite order as the items of the first menu level.

In one embodiment, as shown at block 225, displaying the second menu level includes making the items of the second menu level visually distinct from the items of the first menu level. It should be appreciated that the second menu level may be made visually distinct from the items of the first menu level in many different ways, such as, and without limitation, using different background or foreground colors for the levels, using different fonts or character sizes for the levels, using dividers between the levels, and using animation effects. For example, the text of the second menu level may be in a different color than the text of the first menu level, the background of the second menu level may be in a different color than the background of the first menu level, a line may separate the first menu level from the second menu level, or one level can be indented from the other level.

In one embodiment, as shown at block 222, a portion of selectable items of the second menu level is shown, wherein the portion is selected according to a probability of selection.

In one embodiment, as shown at block 230, process 200 includes displaying a selected browsing path for indicating selected items of the hierarchical menu structure. For example, as items of different levels of the hierarchical menu structure are selected, part or all of the selections made (the selected browsing path) can be displayed at the top of the display screen.

Figure 3:
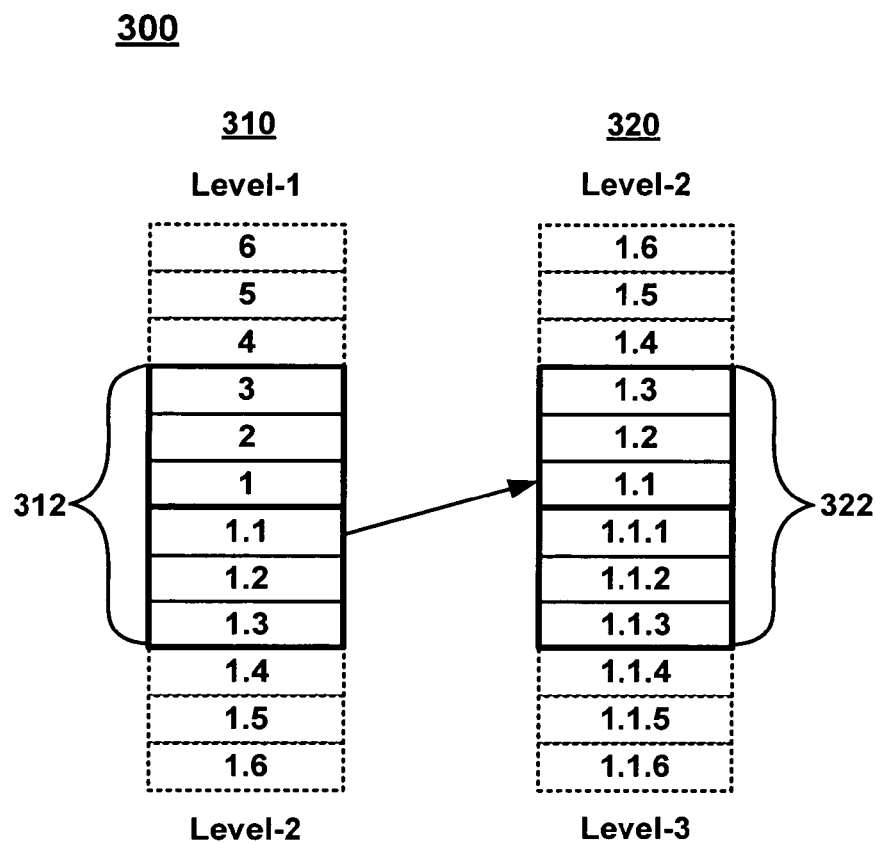
FIG. 3 illustrates an example menu display in accordance with an embodiment of the present invention.

FIG. 3 illustrates an example menu display operation 300 in accordance with an embodiment of the present invention. Specifically, FIG. 3 illustrates first stage 310 and second stage 320 of an example menu display operation 300.

First stage 310 corresponds to blocks 210 and 215 of FIG. 2A as described above. First stage 310 includes a first menu level (Level-1) and a second menu level (Level-2). Display area 312 illustrates the portion of the first menu level and second menu level that are displayed on a display screen of an electronic device upon which embodiments of the present invention may be implemented.

As shown in first stage 310, the items of the first menu level are shown in a descending order, which means they are displayed in an opposite order as the items of the second menu level, which are shown in an ascending order. Furthermore, as shown, the second menu level associated with item 1 of the first menu level is shown. In one embodiment, the second menu level associated with item 1 of the first menu level is displayed automatically based on the probability that item 1 will be selected. In another embodiment, the second menu level associated with item 1 of the first menu level is displayed in response to a user selection. In yet another embodiment, the second menu level associated with item 1 of the first menu level is displayed in response to a user pre-selection, e.g. hovering.

It should be appreciated that various electronic devices are capable of distinguishing between types of user inputs such that they can support different responses for pre-selection and selection. The distinction can be based on any myriad of characteristics. For example, some electronic devices with a touch screen can distinguish between an input device hovering over the touch screen (a non-contact state) and the input device touching the touch screen (a contact state). Such electronic devices can be configured to consider hovering over a selectable item to be pre-selection of the selectable item, and touching the selectable item to be selection of the selectable item. As another example, some electronic devices use cursors, pointers, highlighters, or other visual selectors to facilitate user input. Such devices can be configured to consider placing a visual selector in the same visual area as a selectable item to be pre-selection, and actuating a button while the visual selector is in the same visual area to be selection. Distinguishing pre-selection from selection, or either pre-selection or selection from other types of input, can involve any other appropriate criterion, including time, input history, electronic device mode, etc.

Electronic devices can also be configured to accept multiple different types of input as pre-selection or selection. For example, an electronic device can be configured to respond with pre-selection results to an input object hovering over a touch screen of the electronic device or a visual selector overlapping a selectable item. As another example, an electronic device can be configured to respond with selection results to an input object touching a touch screen of the electronic device or a button being clicked while a visual selector is overlapping a selectable item.

It should be appreciated that the pre-selection and selection inputs are not limited to the embodiments described above. For example, in one embodiment, an electronic device is configured to consider a user browsing to a child menu to be an intention to advance one level of browsing—this is akin to selecting the associated selectable item of a parent menu. This thus frees the display area allotted for the parent menu for other uses, including displaying subsequent menus.

With reference to FIG. 2B, at block 235, responsive to a selection of a selectable item of the second menu level, a third menu level of the hierarchical menu structure is displayed, wherein the third menu level is dependent on the selectable item of the second menu level, and wherein items of the third menu level are contiguous. In one embodiment, the selection is made by a user action.

In one embodiment, as shown at block 240, in response to the selection of the selectable item of the second menu level, at least part of the first menu level is removed from display. In one embodiment, the entire first level is removed from display, such that the items of the second menu level are also contiguous.

In one embodiment, as shown at block 245, in response to the selection of the selectable item of the second menu level, a display order of the items of the second menu level is inverted.

In one embodiment, as shown at block 250, in response to the selection of the selectable item of the second menu level, at least part of the second menu level is removed from display.

With reference to FIG. 3, second stage 320 illustrates an example result in response to a selection of a selectable item 1.1 of a second menu level. Second stage 320 corresponds to block 235 of FIG. 2B as described above. Second stage 320 includes a second menu level (Level-2) and a third menu level (Level-3). Display area 322 illustrates the portion of the second menu level and third menu level that are displayed on a display screen of an electronic device upon which embodiments of the present invention may be implemented. It should be appreciated that although three items of the second menu level (Level-2) and three items of the third menu level (Level-3) are shown as included by display area 322, it is understood that other embodiments can have any number of items shown, with any ratio of items between the second and third menu levels (Level-2 and Level-3, respectively).

As shown in second stage 320, the display order of the items of the second menu level are inverted from the order displayed in first stage 310, e.g., from ascending to descending. Furthermore, as shown, the items of the first menu level are removed from display, such that the items of the second menu level are contiguous and items from the third menu level are contiguous. In one embodiment, the third menu level associated with item 1.1 of the second menu level is displayed in response to a user selection.

It should be appreciated that the embodiment described in FIG. 3 provides repetition of the just-browsed menu in two consecutive browsing stages. As shown in FIG. 3, after the lower menu is browsed and an item is selected, the browsing moves on to the second stage 320. In the second stage 320, the just-browsed menu (Level-2) is now displayed in the top space while the new menu (Level-3) takes over the bottom space.

In one embodiment, only the just-selected item from the just-browsed menu is displayed in the subsequent display, e.g., only item 1.1 in the Level-2 menu is displayed in the display area 322 of the second stage 320, instead of items 1.1, 1.2, and 1.3. This arrangement maximizes the amount of the new menu that can be displayed, and helps to draw the user's maximal attention to the new menu, e.g., items in menu Level-3 in the second stage 320. Meanwhile, the display of the just-selected item from the just-browsed menu indicates that more options are available if browsing proceeds toward the just-selected item. The present embodiment also provides for the opportunity to correct a selection error made in selecting the just-selected item of the previous menu level. The availability of the just-browsed menu provides a low cost error correction solution. It should be appreciated that although the present embodiment uses the just-selected item of the just-browsed menu, it is understood that alternatives include other items of the just-browsed menu, items of other menus, the selected browsing path, and some other indicators.

It should be appreciated that many ways of error correction exist. In one embodiment, previous menu levels no longer shown in the display area are available by scrolling through the higher menu level presented. For example, referring to second stage 320 of FIG. 3, the embodiment makes the Level-1 menu level available attached to the Level-2 menu level—on the end of the Level-2 menu level that is not shown. This means that a user can scroll through the Level-2 menu selectable items shown in display area 322 and reach Level-1 menu selectable items. This is even though display area 322 may not show the Level-1 menu selectable items until the user has scrolled through the Level-2 menu level.

In some embodiments, as higher menu levels, e.g., parent menu levels, are browsed, the lower menu levels, e.g., children menu levels, that are displayed change to reflect the browsing of the higher menu levels. This is in contrast to embodiments where the lower menu levels that are displayed change with selections of items in the higher menu levels and not browsing of higher menu levels. It should be appreciated that the "higher" and "lower" descriptors herein are used to reflect hierarchical relations, such that a "higher" menu level may actually be shown below a "lower" menu level on a display.

In one embodiment where the lower menu level that is displayed changes with browsing of a higher menu level, as a selectable item of a higher menu level is browsed to the display changes to show the lower menu level associated with that selectable item of the higher menu level. Thus, as selectable items of the higher menu level are browsed through, the display changes to show the next menu level for the current selectable item. In another embodiment, a time criterion is incorporated such that the lower menu level changes in response to the browsing pausing on a particular selectable item for a duration of time, e.g., in a system where hovering is recognized as pausing, where the hovering over a particular selectable item has lasted for a particular amount of time. In this way, the system responds to pre-selection by changing the lower menu level displayed to reflect the browsing, and to selection by no longer changing the lower menu level displayed to reflect the browsing.

In one embodiment, in response to a selection of a selectable item of the higher menu level, the display of the lower menu level is updated (or no longer changes if the proper lower menu level is already shown) to reflect the selection made in the higher menu level. This makes the appropriate lower menu level available for further selection.

For instance, in one embodiment, with reference to first stage 310 of FIG. 3, as Level-1 (shown on the upper portion of the list) is scrolled through, Level-2 (shown on the lower portion of the list) is updated to reflect the scrolling. For example, when a user scrolls over selectable item 1, Level-2 shows the next menu level for selectable item 1 (e.g., selectable items 1.1 through 1.m), and when a user scrolls over selectable item 2, Level-2 shows the next menu level for selectable item 2 (e.g., selectable items 2.1 through 2.n).

In one embodiment, in response to a selection of a selectable item of the upper menu level, items of the upper menu level shifts such that the selected item becomes the first item displayed in the upper menu level and the lower menu changes to reflect the selection. In this case, the selected item may be displayed contiguous to the lower menu level. For example, applying this to what is shown in FIG. 3 and with reference to first stage 310, in response to a user selecting selectable item 3, items of Level-1 will shift such the selectable item 3 is the item of Level-1 displayed closest to Level-2, and Level-2 will display the next menu level for selectable item 3, e.g., selectable items 3.1 through 3.n (not shown).

As described above, there are numerous ways of recognizing selection. In one embodiment, browsing to the lower menu level shown is accepted as selection. A time criterion can also be incorporated such that the browsing to the lower menu level has to have lasted past a reference amount of time. For example, in a touch screen enabled system, the hovering of an input object over the displayed lower menu level results in selection of the selectable item of the higher menu level that is associated with the displayed lower menu level. For example, hovering over the example lower menu level showing items 5.4.1-5.4.x is treated as selection of selectable item 5.4 in the higher menu level. This effectively advances one menu level such that the lower menu level being browsed becomes the current menu level for leading to even lower menu levels. Consequently, in some embodiments, the display area formerly allotted to the higher menu level is replaced by the lower menu level, and the display area formerly allotted to the lower menu level is replaced by the even lower menu level. In other embodiments, the display area formerly allotted to the higher menu level is replaced by the even lower menu level, and the display area formerly allotted to the lower menu level is still allotted to the lower menu level. For example, with reference to first stage 310 of FIG. 3, in response to user hovering an input object over the displayed Level-2, the selectable item of the Level-1 associated with the then-displayed Level-2 is selected. Further, the display portion just used by Level-1 may be replaced by Level-2 entries and the display portion just used by Level-2 may be replaced by Level 3 entries. Alternatively, the display portion just used by Level-1 may be replaced by Level-3 entries and the display portion just used by Level-2 are still used by Level-2.

Returning to FIG. 2B, in one embodiment, as shown at block 255, responsive to the selection of the selectable item of the second menu level, a fourth menu level of hierarchical menu structure is displayed, in which fourth menu level is dependent on a selectable item of the third menu level and wherein items of the fourth menu level are contiguous.

In one embodiment, the most probable candidates from two consecutive menu levels are selected by default and presented in a browsing stage. If the prediction is correct in one level or both, one or two menu browsing steps are thus skipped. As a result, the browsing efficiency is further improved as the cost is guaranteed to be no higher than the original level-by-level browsing.

It should be appreciated that, in one embodiment, block 255 can be performed automatically without user interaction. For example, a probabilistic determination as to which menu item of the third menu level that is most likely to be selected is made, and at block 255 the fourth menu level associated with this menu item is displayed. In another embodiment, block 255 is performed in response to a user selecting a menu level item of the third menu level.

Figure 4:
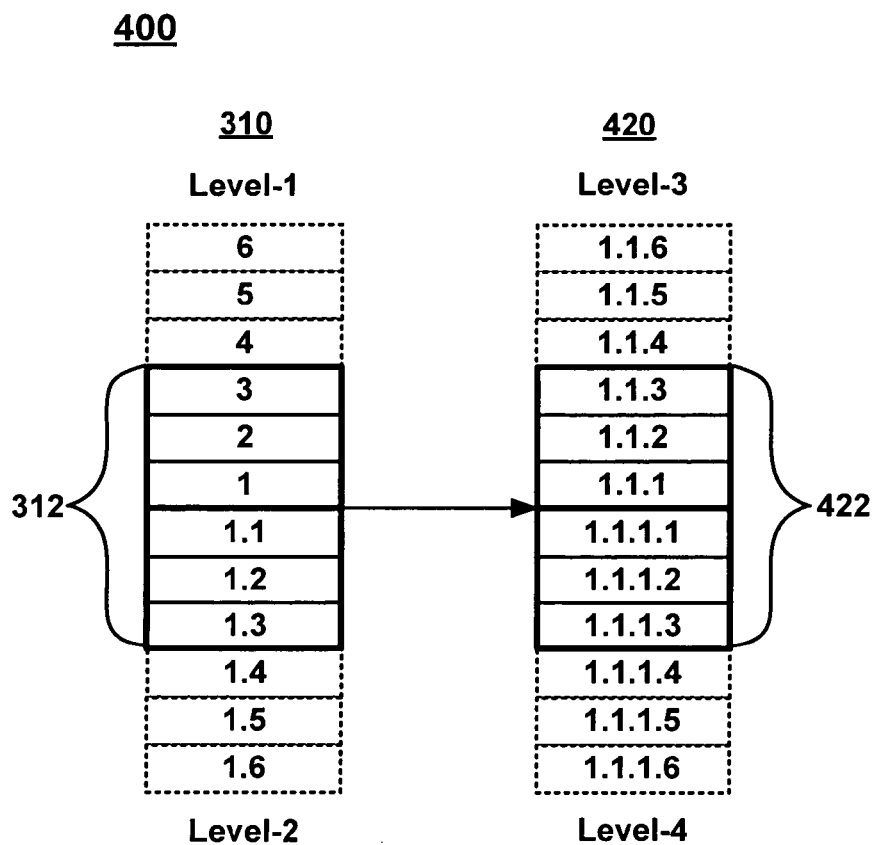
FIG. 4 illustrates an example menu display in accordance with another embodiment of the present invention.

FIG. 4 illustrates an example menu display operation 400 in accordance with another embodiment of the present invention. Specifically, FIG. 4 illustrates first stage 310 and second stage 420 of an example menu display operation 400.

It should be appreciated that first stage 310 is described above in accordance with FIG. 3, and the description of first stage 310 is not duplicated herein for purposes of brevity. Second stage 420 illustrates an example selection of a selectable item 1.1 of a second menu level in accordance with another embodiment of the present invention. Second stage 420 corresponds to blocks 235 and 255 of FIG. 2B as described above. Second stage 420 includes a third menu level (Level-3) and a fourth menu level (Level-4). Display area 422 illustrates the portion of the third menu level and fourth menu level that are displayed on a display screen of an electronic device upon which embodiments of the present invention may be implemented.

As shown in second stage 420, the items of the first menu level and the second menu level are removed from display, such that the items of the third menu level are contiguous and items from the fourth menu level are contiguous. In one embodiment, the third menu level associated with item 1.1 of the second menu level is displayed in response to a user selection and the fourth menu level associated with item 1.1.1 of the third menu level is displayed automatically based on the probability that item 1.1.1 will be selected. In another embodiment, the fourth menu level associated with item 1.1.1 of the third menu level is displayed in response to a user selection.

It should be appreciated that the embodiment described in FIG. 4 provides an increased likelihood in halving the number of browsing stages over the conventional level-by-level browsing scheme. Such a reduction in browsing stages could benefit the browsing of a deep menu hierarchy. Applications demanding browsing speed could also benefit from the described embodiment.

FIG. 5 is a flowchart illustrating a process 500 for presenting a phonetic-to-ideogram conversion menu structure in accordance with an embodiment of the present invention. Although specific operations are disclosed in process 500, such steps are exemplary. That is, embodiments of the present invention are well-suited to performing various other operations or variations of the operations recited in process 500. The operations in process 500 may be performed in an order different than presented, and it is possible that not all of the operations in process 500 are performed. All of, or a portion of, the operations described by process 500 may be implemented using computer-readable and computer-executable instructions which reside, for example, in computer-usable media of a computer system. In one embodiment, process 500 is performed in an electronic device. It should be appreciated that various operations have been left out of the following discussion for purposes of brevity and clarity, and that various additional embodiments are described above in accordance with process 200 of FIGS. 2A and 2B.

At block 505 of process 500, a multiple selection menu including a plurality of selectable hierarchical menu structures is displayed. In one embodiment, the multiple selection menu is for presenting a list of hierarchical phonetic-to-ideogram conversion menus to a user, such as different text entry hierarchical menu structures. For example, the multiple selections menu may include selections such as a phonetic Chinese-to-word conversion menu structure, a phonetic Japanese-to-word conversion menu structure, and a phonetic Korean-to-word conversion menu structure.

At block 510, a first input for text entry is received. In one embodiment, the first input includes a stroke. In another embodiment, the first input includes a character. It should be appreciated that the first input can include any information that may be used to identify a phonetic selection menu.

At block 515, a phonetic selection menu level of a hierarchical phonetic-to-ideogram conversion menu structure is displayed in a one-dimensional list, e.g., menu level 1 of FIG. 1.

At block 520, an ideogram selection menu level of the hierarchical phonetic-to-ideogram conversion menu structure is displayed in the one-dimensional list, e.g., a portion of menu level 2 of FIG. 1, wherein the ideogram selection menu level is dependent on a selectable item of the phonetic selection menu level. In one embodiment, phonetic entries of the phonetic selection menu level are contiguous and ideograms of the ideogram selection menu level are contiguous. In other words, the phonetic entries of the phonetic selection menu level are grouped together and ideograms of the ideogram selection menu level are grouped together.

Various embodiments of the present invention provide a reduction of menu browsing stages by predicting possible browsing path in a menu hierarchy. It should be appreciated that, in one embodiment, block 520 can be performed automatically without user interaction. For example, a probabilistic determination as to which phonetic entry of the phonetic selection menu level that is most likely to be selected is made, and at block 520 the ideogram selection menu level associated with this phonetic entry is displayed. In another embodiment, block 520 is performed in response to a user selecting a phonetic entry of the phonetic selection menu level. Moreover, it should be appreciated that the probabilistic determination can be based on usage characteristics of the particular language being converted, the usage characteristics of the particular user, or the usage history of the particular device enabled with an embodiment of the present invention.

At block 525, responsive to a selection of an ideogram of the ideogram selection menu level, a multiple ideogram selection menu level of the hierarchical phonetic-to-ideogram conversion menu structure is displayed, wherein the multiple ideogram selection menu level is dependent on an ideogram of the ideogram selection menu level, and wherein multiple ideograms of the multiple ideogram selection menu level are contiguous. In one embodiment, the selection is made by a user action. In another embodiment, the selection is made automatically based on the probability that a particular multiple ideogram will be used.

At block 530, a text entry separator selection menu level is displayed. In one embodiment, the text entry separator selection menu level is displayed responsive to the selection of an ideogram of the ideogram selection menu level. In another embodiment, the text entry separator selection menu level is displayed responsive to the selection of a multiple ideogram of the multiple ideogram selection menu level. The text entry separator selection menu level can include selectable items for placement after an ideogram or multiple ideograms or simply for indicating the selection of an ideogram or multiple ideograms. For example and without limitation, the text entry separator selections can include a space, a non-space indicator (for continuing text entry), or various punctuation.

In one embodiment the most probable candidates from two consecutive menu levels are selected by default and presented in a browsing stage. If the prediction is correct in one level or both, one or two menu browsing steps are thus skipped. As a result, the browsing efficiency is further improved as the cost is guaranteed to be no higher than the original level-by-level browsing.

At block 535, an ideogram is output to an application in response to a selection of a text entry separator of the text entry separator selection menu level.

It should be appreciated that while FIG. 5 illustrates an embodiment using a phonetic-to-word menu structure, other embodiments of text entry hierarchical menu structures can also be implemented. For example, other embodiments of text entry hierarchical menu structures that can be used to produce ideograms can be based on the number of strokes, the stroke type, the radicals, and the like of the input.

Figure 6:
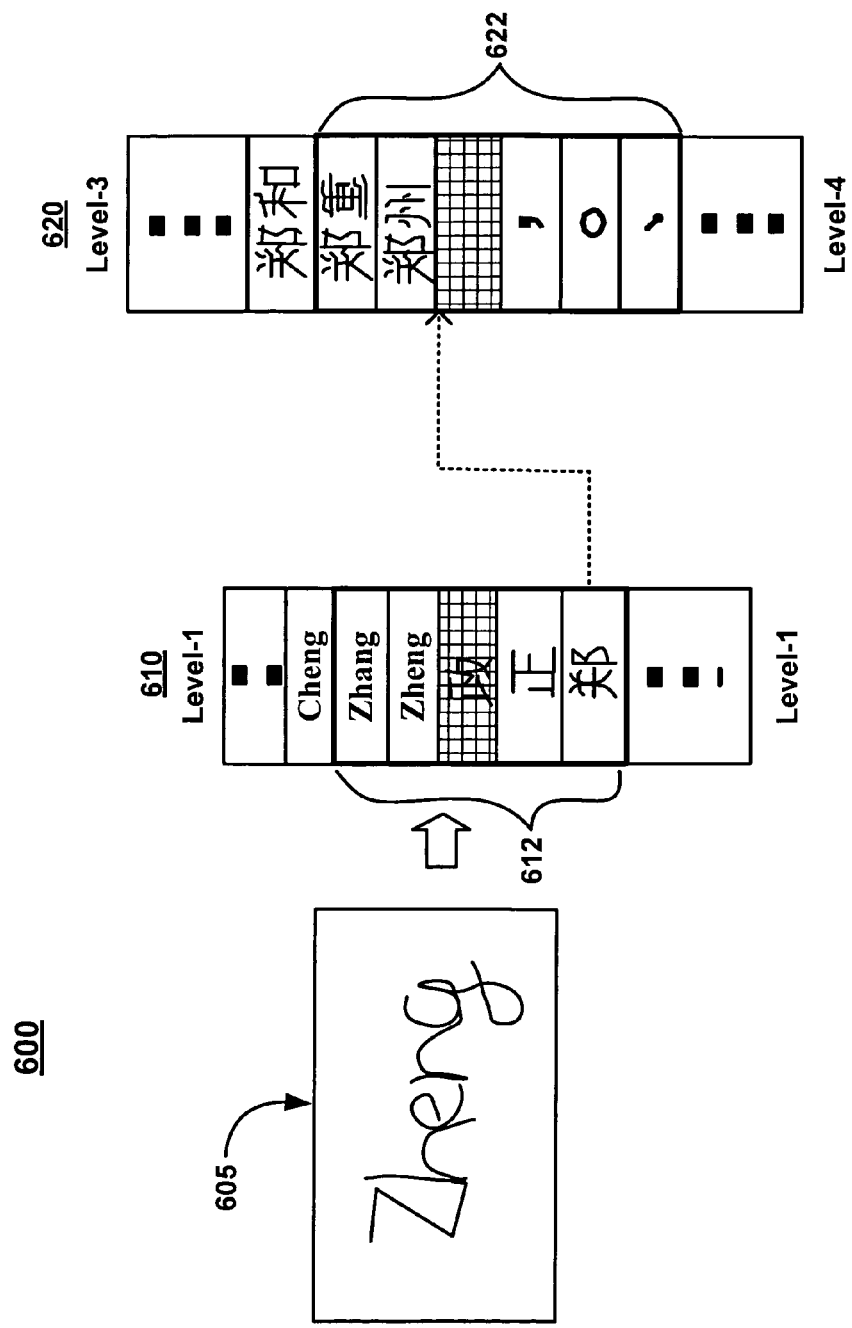
FIG. 6 illustrates an example phonetic-to-ideogram conversion menu display in accordance with an embodiment of the present invention.

FIG. 6 illustrates an example phonetic-to-ideogram conversion menu display operation 600 in accordance with an embodiment of the present invention. Specifically, FIG. 6 illustrates first stage 610 and second stage 620 of an example menu display operation 600.

First stage 610 corresponds to blocks 515 and 520 of FIG. 5 as described above. First stage 610 includes a phonetic selection menu level (Level-1) and an ideogram selection menu level (Level-2). Display area 612 illustrates the portion of the phonetic selection menu level and ideogram selection menu level that are displayed on a display screen of an electronic device upon which embodiments of the present invention may be implemented. Input region 605 illustrates example text inputs corresponding to menu level selection.

Second stage 620 illustrates an example selection of a selectable ideogram of an ideogram selection menu level in accordance with an embodiment of the present invention. Second stage 620 corresponds to blocks 525 and 530 of FIG. 5 as described above. Second stage 620 includes a multiple ideogram selection menu level (Level-3) and a text entry separator selection menu level (Level-4). Display area 622 illustrates the portion of the multiple ideogram menu level and text entry separator selection menu level that are displayed on a display screen of an electronic device upon which embodiments of the present invention may be implemented. As shown, display area 622 contains more items than display area 612, given the different amounts of space allotted to the different selectable items. It is understood that a display areas can have any number of selectable items as appropriate.

Figure 7:
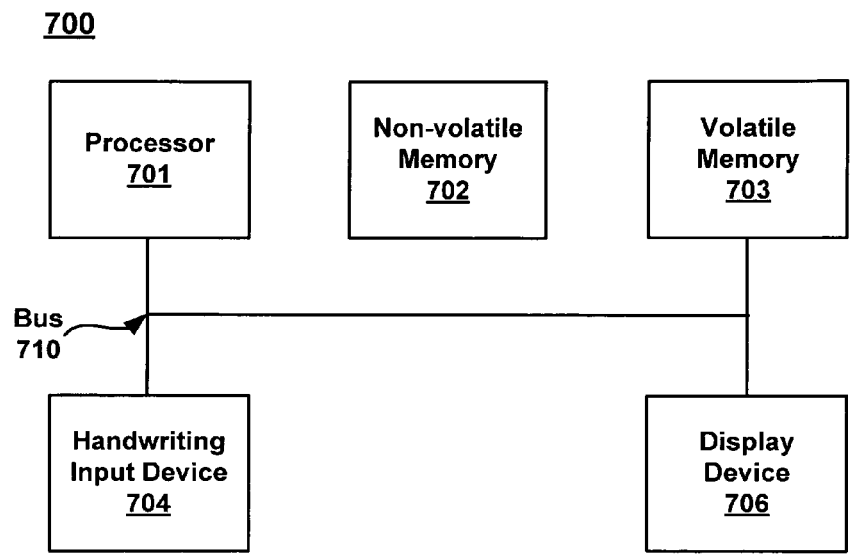
FIG. 7 is a block diagram showing components of an example electronic device upon which embodiments of the present invention may be practiced.

FIG. 7 is a block diagram showing components of an example electronic device 700, upon which embodiments of the present invention may be practiced. In general, electronic device 700 includes bus 710 for communicating information, processor 707 coupled with bus 710 for processing information and instructions, read-only (non-volatile) memory (ROM) 702 coupled with bus 710 for storing static information and instructions for processor 707, and random access (volatile) memory (RAM) 703 coupled with bus 710 for storing information and instructions for processor 707. Electronic device 700 also includes text input device 704 coupled with bus 710 for receiving text-related input, and display device 706 coupled with bus 710 for displaying information. In one embodiment, text input device 704 can be a handwriting text input device for receiving stroke input.

In one embodiment, text input device 704 is operable to receive text-related input from a user. For example, text input device 704 may be a keypad or keyboard, a voice recognition system, or any other type of input capable of receiving text-related input from a user. In one embodiment, text input device 704 is a handwriting text input device operable to receive pen-, stylus-, or finger-based handwritten input from a user. For example, a text input device 704 for receiving handwriting may be a digitizing tablet, a touchpad, an inductive pen tablet, or the like. This type of text input device 704 is operable to capture X and Y coordinate information of the input in the form of stroke data. In other words, this type of text input device 704 is a coordinate entry device for detecting in real-time symbol strokes written in the natural stroke order of a symbol and/or word.

Display device 706 utilized with electronic device 700 may be a liquid crystal device (LCD) or other display device suitable for creating graphic images and alphanumeric or ideographic symbols recognizable to the user. Display device 706 is operable to display recognized symbols. In one embodiment, the recognized symbols are displayed as text.

Various embodiments of the present invention, a method for presenting a menu, are thus described. While the present invention has been described in particular embodiments, it should be appreciated that the present invention should not be construed as limited by such embodiments, but rather construed according to the below claims.

What is claimed is:

1. A method for presenting a menu on a display of an electronic device, said method comprising:
    displaying, on a display of an electronic device, a first menu level of a hierarchical menu structure in a one-dimensional list; and
    displaying, on said display, a second menu level of said hierarchical menu structure together with said first menu level in said one-dimensional list, wherein display of said second menu level is dependent on a selectable item of said first menu level and wherein items of said first menu level are contiguous and items of said second menu level are contiguous, and wherein selectable items of said first and second menu levels are displayed in opposing hierarchical order from one another.

2. The method of claim 1 further comprising:
    responsive to a selection of a selectable item of said second menu level, displaying a third menu level of said hierarchical menu structure on said display, wherein said third menu level is dependent on said selectable item of said second menu level, and wherein items of said third menu level are contiguous.

3. The method of claim 2 further comprising:
    responsive to said selection of said selectable item of said second menu level, removing at least part of said first menu level from display on said display.

4. The method of claim 2 further comprising:
    responsive to said selection of said selectable item of said second menu level, inverting a display order of said items of said second menu level on said display.

5. The method of claim 2 further comprising:
    responsive to said selection of said selectable item of said second menu level, removing at least part of said second menu level from display on said display.

6. The method of claim 2, further comprising:
    responsive to said selection of said selectable item of said second menu level, displaying a fourth menu level of said hierarchical menu structure on said display, wherein said fourth menu level is dependent on a selectable item of said third menu level and wherein items of said fourth menu level are contiguous.

7. The method of claim 1 further comprising:
    responsive to a pre-selection of a selectable item of said second menu level, displaying a third menu level of said hierarchical menu structure on said display, wherein said third menu level is dependent on said selectable item of said second menu level, and wherein items of said third menu level are contiguous.

8. The method of claim 1 further comprising:
    prior to said displaying said first menu level and said second menu level on said display, displaying a multiple selection menu comprising a plurality of selectable hierarchical menu structures on said display, wherein said displaying said first menu level and said second menu level is responsive to a selection of said hierarchical menu structure of said plurality of hierarchical menu structures.

9. The method of claim 1 wherein said displaying, on said display, a second menu level of a hierarchical menu structure comprises:
    making said items of said second menu level visually distinct from said items of said first menu level.

10. The method of claim 1 further comprising:
    displaying, on said display, a selected browsing path for indicating selected items of said hierarchical menu structure.

11. The method of claim 1 wherein said hierarchical menu structure is dynamic such that an order of said items said first menu level and an order of said items of said second menu level adapt based at least in part on a pattern of usage.

12. The method of claim 1 wherein said displaying, on said display of said electronic device, a first menu level comprises selectively displaying, on said display, a portion of selectable items of said first menu level according to a probability of selection; and
    wherein said displaying, on said display, a second menu level comprises selectively displaying, on said display, a portion of selectable items of said second menu level according to a probability of selection.

13. The method of claim 1 wherein said hierarchical menu structure comprises a text entry menu structure.

14. The method of claim 13 wherein said text entry menu structure comprises a character-to-word conversion menu structure, wherein said first menu level comprises a character selection, said second menu level comprises a word selection, and said third menu level comprises a multiple word selection.

15. The method of claim 13 wherein said text entry menu structure comprises a phonetic-to-ideogram conversion menu structure, wherein said first menu level comprises a phonetic selection, said second menu level comprises an ideogram selection, and said third menu level comprises a multiple ideogram selection.

16. The method of claim 13 wherein a last menu level of said text entry menu structure comprises a text entry separator selection.

17. The method of claim 16 wherein the text entry separator selection is selected from the group consisting of a punctuation symbol and a space.

18. The method of claim 1, wherein said first menu level is hierarchically above said second menu level in said hierarchical menu structure.

19. One or more non-transitory computing device readable storage media for storing instructions that, when executed by one or more processors, perform a method for displaying a menu in a one-dimensional list, said method comprising:
   displaying a first menu level and a second menu level of a hierarchical menu structure together in a one-dimensional list, wherein display of said second menu level is dependent on a selectable item of said first menu level, wherein items of said first menu level and items of said second menu level are contiguous, and wherein said items of said first menu level and said items of said second menu level are displayed in opposing hierarchical order from one another;
   displaying a third menu level of said hierarchical menu structure in said one-dimensional list in response to a selection of a selectable item of said second menu level, wherein said third menu level is dependent on said selectable item of said second menu level and wherein items of said third menu level are contiguous; and
   removing said first menu level from display in said one-dimensional list in response to said displaying said third menu level.

20. The one or more non-transitory computing device readable storage media of claim 19, wherein said first menu level is hierarchically above said second menu level in said hierarchical menu structure.

21. A system for presenting a menu in a one-dimensional list, said system comprising:
   a processor;
   a memory communicatively coupled to said processor; and
   a display communicatively coupled to said processor;
   wherein said processor is operable to display a first menu level and a second menu level of a hierarchical menu structure together in a one-dimensional list on said display, wherein display of said second menu level is dependent on a selectable item of said first menu level and wherein items of said first menu level are contiguous and items of said second menu level are contiguous, wherein items of said first and second menu levels are displayed in opposing hierarchical order from one another, and wherein said processor is operable to display a third menu level of said hierarchical menu structure in said one-dimensional list on said display in response to a selection of a selectable item of said second menu level, wherein said third menu level is dependent on said selectable item of said second menu level.

22. The system of claim 21, wherein said processor is operable to remove at least part of said first menu level from display in said one-dimensional list in response to said selection of said selectable item of said second menu level.

23. The system of claim 21, wherein said first menu level is hierarchically above said second menu level in said hierarchical menu structure.

* * * * *